Patented Nov. 19, 1940

2,221,945

UNITED STATES PATENT OFFICE 2,221,945

MOLDABLE SHEET COMPOSITION AND PROCESS OF PREPARING SAME

Norman D. Hanson, Bloomfield, N. J., assignor, by mesne assignments, to Union Carbide and Carbon Corporation, New York, N. Y., a corporation of New York No Drawing. Application November 19, 1936, Serial No. 111,614

12 Claims. (Cl. 92—21)

This invention relates to moldable compositions in which a synthetic resin of the heat-hardening type, such as a phenol-aldehyde resin, is used as a binder.

In making use of heat-hardening resins as binders two distinctly different types of products are obtained depending upon the structure or physical character of the filler to be bonded. One is known as plastic or hot press molded in which the filler is in the form of finely divided discrete particles or fibers, and the other is known as laminated in which the filler is in the form of a sheet material. These differ quite widely as to the nature of the articles produced and their properties. Plastic molded articles are obtainable in various intricate shapes, while laminated products are limited to the simple forms of plates and tubes; but in impact strength, for example, molded articles are relatively very weak showing normally an impact value of about 1.5 ft. lbs. per in. sq., while laminated products are relatively very strong with an average impact value of about 30 ft. lbs. per in. sq. Because of the widely varying properties of molded and laminated products there have developed two distinct and separate industries, each with its own technic and apparatus.

The customary process of preparing compositions suitable for molding by plastic flow consists in combining the resin, brought to the proper condition of solidification, with the fibers or other finely divided filler such as wood flour by means of mixing on heated differential rolls; other processes of mixing can be followed but the rolling operation is used to the practical exclusion of other methods due to the fact that the resin is fluxed and forced into intimate contact with the fibrous filler to thereby yield a composition of greater homogeneity than is afforded by the other types of mixing. The material comes from the rolls in the form of a brittle friable sheet which is broken up and ground to produce the molding powder. An essential characteristic of a molding powder is that under the action of heat and pressure in a closed mold it fluxes and flows equally in all directions to a sufficient extent to accurately take the conformation of the mold and form a resinous surface and thereby impart the finished polished apearance. In the molding of these powders pressures in the neighborhood of 2000 to 3000 lbs. per sq. in. and temperatures ranging from 140 to 165° C. are used, and the molding period is on the average of from 1 to 3 minutes for objects of a thickness ranging from 1/8 to 3/16 of an inch.

In the manufacture of laminated materials the process generally followed is that of coating cloth or paper sheets with a varnish composed of a synthetic resin dispersed in a solvent. The solvent is removed by drying and the coated sheet is cut into sections of convenient size which are thereupon superimposed in desired number and submitted to high pressures between heated platens to flux or fuse the resin and thus secure a cementing action. The limitation to the formation of simple forms such as plates arises from the fact that the resin-coated fiber sheets have no appreciable flow due to the matting of the fibers and therefore cannot be subjected to any distorting action requiring flow of the material without tearing of the sheets.

To dispense with the use of a solvent, another process has been developed of mixing fibers in the form of wet pulp with a powdered resin, laying the pulp including the resin on a screen and abstracting the water to form a sheet. A sheet made in this maner has the resin distributed throughout its mass and in this respect differs from varnish-coated sheet which has resin concentrated on the surface. By the wet pulp process sheets or boards to a thickness of one-half inch, for exampie, can be prepared with the use of a cylinder machine. The limitation of lack of appreciable flow still persists, however, in sheets made by the wet pulp process with the consequent limitation to shapes of simple form.

The relatively high impact strength which characterizes sheet products is due to the presence of long fibers in those products which mat and consequently impart their strength to the product. The lack of impact strength in molded articles is ascribable to the short fibers which alone are subjected to the procedure followed in the preparation of molded compositions; if long fibers are initially included they are broken up in the rolling and grinding operations into short non-matting fibers.

The present invention is based on the surprising discovery that flow requisite for molding operations can be imparted to compositions in sheet form made from long matting fibers and thereby obtain the high impact strengths which they impart. Briefly the invention comprises incorporating into a wet long fiber pulp and resin mixture or into wet long fiber pulp alone a proportion of molding material made from short non-matting fibers or granular fillers, such as wood flour, mechanically ground pulp, asbestos fibers, etc. and mixed with a heat-hardening resin in the usual manner of hot-rolling. The composite mixture in water is stirred to a homogeneous condition, run onto screens for removing the water and the sheets thus formed are dried by running through calendering rolls or by passing through a drying oven. The sheeted mixture can also be built up on cylinder machines to a desired thickness, generally less than one inch, and the board so formed is dried by suspending in a loft through which warm, dry air is circulated. By the blending of pulp or resin-pulp with moldable resin-filler it is found that compositions are obtained possessing high impact strength as compared with the molding material alone and in addition a flow to the extent that it can be readily molded into the most intricate shapes, apparently on account of the interspersion between the long interlacing fibers of discrete particles of free flowing molding mixture.

The amount of moldable material made from a resin and non-matting filler, added to the resin-pulp composition can be as little as 10% and yet show a noticeable effect on the flowing properties of the final resin-fiber composition, while as much as 75% can be added to give a free-flowing material and yet retain a considerable resistance to shock. Lesser proportions of moldable resin-containing material are effective for pulp compositions containing major proportions of mechanical or short fiber pulp, while the higher proportions of molding material should be used when the higher proportions of chemical or long fiber pulp are present in the pulp composition. Usually, however, 20-25% of moldable resin-containing material added to a wet pulp composition composed of one part chemical pulp and one part mechanical pulp is found to give the best balance between impact value and flowing qualities.

For the long fiber pulp any chemically digested fibers such as sulphite or sulphate pulp, or pulp made by the soda process can be used, or there can be included in part mechanically-treated fiber such as news fiber or ground wood. Generally, it is preferred to use a wet pulp composed entirely or for the major part of chemical pulp, although two to three parts of chemical pulp to one part of mechanical pulp have given satisfactory results as also have equal parts of chemical pulp and mechanical pulp; while for some purposes it has even been found desirable to use one part of chemical to two to three parts of mechanical pulp. In general, it may be said that those pulps containing higher proportions of chemical pulp produce compositions which have the greatest shock resistance, while the addition of mechanical pulp decreases the shock resistance but provides an easier flowing material.

For the moldable resin-and-filler material any of the usual molding materials prepared from wood flour, sawdust or similar short fibered filler and synthetic resin, can be used.

The preferred resins for both the resin-pulp and the resin-molding materials are the heat-hardening synthetic resins of the phenol-formaldehyde type. These are usually alkali-catalyzed resins or so-called one-step resins, that is, resins in which phenol is reacted with an equimolecular weight or a greater than equimolecular weight—say, 1½ to 2 mols of formeldehyde in the presence of a condensing agent such as sodium or barium hydroxides or ammonia; such resins are usually used in the form of soft or liquid resins, although hard, brittle resins of this type in finely divided form have proven satisfactory. The so-called Novolaks, i. e., acid catalyzed resins in which phenol is usually reacted with less than an equimolecular quantity of formaldehyde in the presence of an acid (either organic or inorganic) catalyst, are suitable; these resins are regarded as permanently fusible, hard and brittle resins and require the addition of a suitable proportion of methylene hardening agent, such as hexamethylenetetramine, to render them infusible. Again the one-step and Novolak resin can be used in combination. Usually, it is preferred to combine the two resins and in about the proportion of one part of liquid heat-hardening resin to one to three parts of Novolak.

Generally speaking, a resin-pulp mix is preferred which contains from 45-50% resin (based on dried weight) of which 8-12% is one-step heat-hardening resin, while 30-45% is a Novolak resin containing sufficient hexamethylenetetramine to harden it. To this resin-pulp mix there is added a resin-containing molding material containing say about 50% resin which is a one-step resin or a Novolak with added hardener. It is found to be good practice to increase the amount of one-step resin in the resin-pulp mix as the proportion of resin-containing molding material added to the resin-pulp mix is increased.

In using these resin-fiber compositions, it is customary to employ discs, squares or other suitable shapes punched from the dried sheet in sizes, for example one-half inch across, and such punchings are then charged into suitable steel molds and molded under heat and pressure. It is possible to take the sheet and reduce it more or less to a powder by grinding or other means, but such treatment usually results in a finished product of correspondingly lower impact strength. The molded articles are usually discharged hot from the mold and require little or no further finishing except for removal of the fin or flash.

By way of illustration of compositions suitable for molding in accordance with this invention the following examples are given.

*Example 1.*—A heat-hardening one-step resin is prepared in a known manner; for instance approximately equimolecular quantities of cresol and 40% formaldehyde solution along with about 30% (based on cresol) of rosin are reacted in the presence of about 3½% of an alkaline catalyst such as aqueous ammonia or an equivalent amount of sodium or barium hydroxide. The reaction mass is dehydrated preferably under diminished pressure to a point where a sample of the resin when dropped into cold water congeals to a hard, brittle mass. While still warm the dehydrated resin is discharged from the still into a receiver containing cold water which is rapidly agitated. The resin is thereby chilled and granulated to form a coarse suspension of resin in water, and this suspension can be milled in a ball mill to form a fine resin water dispersion. The dispersion is added in a beater containing about 20 parts of white water to each part of dry resin and pulp composed of equal parts of rag and news fiber to form a mass in the proportion of about 450 parts of dry resin to 200 parts of news fiber and 200 parts of rag fiber. After beating the mixture, about 400 parts of molding material ground to about 100 mesh and prepared for example from about equal parts of a heat-hardening phenol resin and a wood flour filler are included; coloring matter and other desired ingredients can be added. The heater composition is then passed through a paper forming machine and built up to a suitable thickness generally about ¼ inch, and the sheets or boards so formed are dried by suspending in a loft for a day or two through which dry air at a temperature of 100 to 120° F. is circulated. After drying the sheets can be calendered to straighten them. The resin content of sheets so formed is about 40–50% and their density is about 0.7.

*Example 2.*—A resin is prepared from equimolecular quantities of cresol and 40% formaldehyde solution in the presence of sodium or barium hydroxide in an amount equal to 0.8 to 1.0% of the phenolic constituent by reacting until a sample withdrawn and cooled separates into layers. The reaction mass is then dehydrated until a viscous liquid resin of about 70% solids content is obtained. 600 parts of the wet viscous resin are mixed in a kneader with 200 parts of news fiber and 200 parts of Kraft fiber until smooth and homogeneous and then charged into a beater together with 400 parts of molding material ground to about 100 mesh prepared as in the previous example. The mixture is diluted with water and formed into a sheet as described in Example 1.

*Example 3.*—A resin of the Novolak type is prepared from about 1500 parts of phenol and 870 parts of 40% formaldehyde solution under pressure of about 140 lbs. When the reaction is completed the aqueous layer is decanted and the wet resin is dehydrated to give a hard brittle resin melting at about 200° F. The resin is ground to about 100 mesh and 440 parts of the resin charged into a mixture containing about 1500 parts of water, 44 parts of hexamethylenetetramine and about 500 parts of Kraft fiber. Then 210 parts of a liquid resin (70% solid) prepared as in Example 2 are kneaded with the mixture and the charge is dumped into a beater together with about 570 parts of a heat-hardening molding material ground to about 100 mesh and brushed out in a beater with sufficient water to give a 5–8% resin-fiber suspension; after beating the mixture is sufficiently diluted so that it can be formed into a sheet as before.

*Example 4.*—A mixture is prepared as in Example 3, the resin constituent consisting of about 390 parts of a Novolak resin, 39 parts of hexa and in addition about 250 parts of a viscous liquid resin prepared as in Example 2. To this mixture there is added in the beater about 1140 parts of the ground molding material, and this is formed into a sheet as described in Example 1.

*Example 5.*—A pulp composition consisting of 400 parts of Kraft fiber and 400 parts of water are mixed in a kneader to a homogeneous condition. About 1200 parts of a molding material with a 50–70% resin content are added and the mass diluted with sufficient water to give a suspension suitable for forming a sheet as before.

In the foregoing examples the molding material that is added to the mixture in the beater is a heat-hardening one-step resin prepared from a phenol such as cresol with substantially equimolecular quantities of 40% formaldehyde in the presence of an alkaline catalyst. The reaction is continued to give a brittle resin upon dehydration and the resin is compounded by blending or hot-rolling with a filler such as wood flour in the proportion of about 1 part of resin to about 1 part of wood flour. A molding material made from a two-step resin, i. e. a Novolak and hexamethylenetetramine, and a filler can be substituted in equivalent amounts to produce the results stated.

Molding compositions prepared in accordance with the foregoing examples were tested by punching squares or discs of about one-half inch across from the dried sheet and charged into a cup mold, and molded at pressures of 2000 to 2500 lbs. at a temperature of about 150° C.; the molding time required was about three minutes when the cups were discharged hot. The punchings can be of any convenient size, as for example from one-fourth to one inch or more. The pieces possessed excellent finish without cracks or flow marks.

For determining the impact strengths test bars were prepared. The compositions were also tested for flow by the flow tester described by Peakes (Plastic Products vol. 10, No. 2, page 53). The following results were noted:

| Examples | Proportion pulp: molding material | Flow at 1,000 lbs. | Impact |
|---|---|---|---|
| | | Inches | Ft. lbs./in. sq. |
| 1 | 1–1 | .25 | 7–9 |
| 2 | 1–1 | .50 | 4.5–6.0 |
| 3 | 1–1 | .52 | 4.5–6.0 |
| 4 | 1–2 | 1.20 | 3.75–5.00 |
| 5 | 1–3 | 1.20 | 3.25–5.00 |

A composition similar to that of Example 3 but omitting the molding material showed no flow in the flow tester at 1000 lbs., but test bars, made by simple compression of the material under pressures in excess of 3000 lbs., gave impact values of 7.6 to 10 ft. lbs. per inch square. The average wood flour molding material has a flow of 1.2 to 1.5″ at 1000 lbs. pressure and impact value of about 1.5 ft. lbs. per in. sq.

Bolts, utensil handles, textile and wire spools, camera and instrument cases, automobile bumper shoes, steering wheels, telephone receivers, radio cabinets, etc., have been successfully molded from the mixed resin-fiber and molding material compositions herein described. Such products have greater mechanical strength than ordinary resin-wood flour molding materials and, due to the flowing qualities which these resin pulp-resin molding material compositions possess, the finished products are equal in appearance to the ordinary resin-wood flour molding materials.

While there has been described principally the use of phenol-formaldehyde type of resins, which resins have been found to be most satisfactory, it is feasible to substitute at least in part other synthetic resins such as urea-formaldehyde resins, aniline formaldehyde or aniline furfural resins, alkyd resins, etc. Part of the synthetic resin can also be replaced with natural resin, such as rosin or gum acroides, or permanently fusible synthetic resins such as the oil soluble phenol-formaldehyde resins or oil modified alkyd resins.

Asbestos fibers can be used to replace a portion of the cellulose fibers and non-fibrous fillers such as clay, talc, silica, etc. can be in part incorporated in the compositions, and dyes, pigments, lubricants, etc., can be added as indicated in the examples.

What is claimed is:

1. Process of preparing a composition moldable by plastic flow under heat and pressure which comprises forming an aqueous pulp containing long fibers, thereafter mixing with the pulp a previously formed mixture of a short fiber and a heat-hardenable resin intimately blended to an extent equivalent to that obtained by hot-rolling, forming the thus-obtained composition into sheets and drying the sheeted composition.

2. Process of preparing a composition moldable by plastic flow under heat and pressure which comprises forming an aqueous pulp containing long fibers, thereafter mixing with the pulp a previously formed mixture of a short fiber and a heat-hardenable resin intimately blended by hot-rolling, forming the thus-obtained composition into sheets and drying the sheeted composition.

3. Process of preparing a composition moldable by plastic flow under heat and pressure which comprises forming an aqueous pulp containing long fibers and a heat-hardenable resin, thereafter mixing with the pulp a previously formed mixture of a short fiber and a heat-hardenable resin intimately blended by hot-rolling, forming the thus-obtained composition into sheets and drying the sheeted composition.

4. Process of preparing a composition moldable by plastic flow under heat and pressure which comprises forming an aqueous pulp containing long fibers, thereafter mixing with the pulp from 10% to 75% of a previously formed mixture of a short fiber and a heat-hardenable resin intimately blended by hot-rolling, forming the thus-obtained composition into sheets and drying the sheeted composition.

5. Process of preparing a composition moldable by plastic flow under heat and pressure which comprises forming an aqueous pulp of wood fiber and a heat-hardenable phenol-formaldehyde resin, thereafter mixing with the pulp a previously formed mixture of wood flour and a heat-hardenable phenol-formaldehyde resin intimately blended by hot-rolling, forming the thus-obtained composition into sheets and drying the sheeted composition.

6. Process of preparing a composition moldable by plastic flow under heat and pressure which comprises forming an aqueous pulp of wood fiber and about 50% of a heat-hardenable phenol-formaldehyde resin, thereafter mixing with the pulp a previously formed mixture of wood flour and about 50% of a heat-hardenable phenol-formaldehyde resin intimately blended by hot-rolling, forming the thus-obtained composition into sheets and drying the sheeted composition.

7. Process of preparing a composition moldable by plastic flow under heat and pressure which comprises forming an aqueous pulp of wood fiber and about 50% of a heat-hardenable phenol-formaldehyde resin, thereafter mixing with the pulp from 10% to 75% of a previously formed mixture of wood flour and about 50% of a heat-hardenable phenol-formaldehyde resin intimately blended by hot-rolling, forming the thus-obtained composition into sheets and drying the sheeted composition.

8. A sheet composition moldable by plastic flow under heat and pressure comprising a water-laid sheet including long fibers admixed with a molding mixture comprising a short fiber filler intimately blended with a heat-hardenable resinous binder, the resinous binder of said molding mixture being in substantially more intimate contact with the short fibers than with the long fibers.

9. A sheet composition moldable by plastic flow under heat and pressure comprising a water-laid sheet including long fibers admixed with a molding mixture comprising a short fiber filler intimately blended with a heat-hardenable phenol-formaldehyde resinous binder, the resinous binder of said molding mixture being in substantially more intimate contact with the short fibers than with the long fibers.

10. A sheet composition moldable by plastic flow under heat and pressure comprising a water-laid sheet including long fibers admixed with from 10 to 75% of a molding mixture comprising a short fiber filler intimately blended with a heat-hardenable phenol-formaldehyde resinous binder, the resinous binder of said molding mixture being in substantially more intimate contact with the short fibers than with the long fibers.

11. A sheet composition moldable by plastic flow under heat and pressure comprising a water-laid sheet including long fibers admixed with from 10 to 75% of a molding mixture comprising a short fiber filler intimately blended with about 50% of a heat-hardenable phenol-formaldehyde resinous binder, the resinous binder of said molding mixture being in substantially more intimate contact with the short fibers than with the long fibers.

12. A sheet composition moldable by plastic flow under heat and pressure comprising a water-laid sheet including long wood fibers admixed with from 10 to 75% of a molding mixture comprising wood flour intimately blended with a heat-hardenable resinous binder, the resinous binder of said molding mixture being in substantially more intimate contact with the short fibers than with the long fibers.

NORMAN D. HANSON.